United States Patent
Combs et al.

(10) Patent No.: US 9,630,699 B2
(45) Date of Patent: Apr. 25, 2017

(54) MAGNETIC LATCHING SYSTEM WITH INFLATABLE SEAL

(71) Applicant: Northrop Grumman Systems Corporation, Falls Church, VA (US)

(72) Inventors: Cory M. Combs, Del Aire, CA (US); Charles R. Smith, Acton, CA (US); John Rufino, Redondo Beach, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 321 days.

(21) Appl. No.: 14/621,220

(22) Filed: Feb. 12, 2015

(65) Prior Publication Data
US 2016/0236764 A1 Aug. 18, 2016

(51) Int. Cl.
*B64C 1/14* (2006.01)
*E05C 19/16* (2006.01)

(52) U.S. Cl.
CPC .............. *B64C 1/14* (2013.01); *B64C 1/1407* (2013.01); *E05C 19/161* (2013.01)

(58) Field of Classification Search
CPC .................................................... B64C 1/1446
USPC .......................................... 70/276; 292/251.5
See application file for complete search history.

(56) References Cited

U.S. PATENT DOCUMENTS

| | | |
|---|---|---|
| 2,916,768 A | 12/1959 | Quere et al. |
| 3,046,827 A | 7/1962 | Myers |
| 3,718,171 A | 2/1973 | Godwin |
| 3,879,970 A | 4/1975 | Salzman et al. |
| 4,946,209 A | 8/1990 | Stauner |
| 5,129,184 A | 7/1992 | Fish |
| 5,468,106 A | 11/1995 | Percival-Smith |
| 5,967,571 A | 10/1999 | Gregerson |
| 6,059,230 A * | 5/2000 | Leggett ................. B64C 1/1461 244/129.4 |
| 6,845,947 B1 * | 1/2005 | Reese, Jr. ............. B64C 1/1476 244/120 |
| 7,185,852 B2 | 3/2007 | Kannapell |
| 7,329,164 B2 * | 2/2008 | Bermal ................. B64C 1/1415 292/144 |

(Continued)

FOREIGN PATENT DOCUMENTS

EP 0247956 A1 12/1987
EP 2 269 857 1/2011

OTHER PUBLICATIONS

European Patent Office, European Search Report, Jan. 3, 2017, 5 pages, Munich, Germany.

*Primary Examiner* — Brian M O'Hara
*Assistant Examiner* — Michael Kreiner
(74) *Attorney, Agent, or Firm* — Stetina Brunda Garred and Brucker

(57) ABSTRACT

A magnetic latching system is provided for removably latching a panel to an aircraft surface portion. The latching system includes a removable axis panel engageable to a latching land. The panel and land define opposing magnetically attractive surface portions, with a body of magnetic material disposed there between. An inflatable seal is also disposed intermediate the panel and the land. Upon inflation, the inflatable seal is operative to urge the panel away from the land far enough to reconnect magnetic engagement between the panel and the land, sufficient to permit disengagement of the panel from the land.

20 Claims, 6 Drawing Sheets

(56) References Cited

U.S. PATENT DOCUMENTS

| | | | |
|---|---|---|---|
| 7,823,835 B2* | 11/2010 | Barker | B64C 1/1415 244/107 |
| 8,225,694 B2 | 7/2012 | Kennedy et al. | |
| 8,443,575 B1 | 5/2013 | Tanner | |
| 8,493,715 B1* | 7/2013 | Angelucci | B64D 45/00 244/1 R |
| 8,500,436 B2 | 8/2013 | Rentz | |
| 9,296,467 B1* | 3/2016 | Hollibaugh | B64C 3/34 |
| 9,458,648 B1* | 10/2016 | Neal | E05B 51/02 |
| 2005/0247823 A1 | 11/2005 | Wood et al. | |
| 2006/0021284 A1 | 2/2006 | Benz | |
| 2011/0307098 A1 | 12/2011 | Ennis | |
| 2015/0082708 A1* | 3/2015 | Eilken | B64C 1/1407 49/477.1 |

* cited by examiner

MAGNETIC LATCHING SYSTEM WITH INFLATABLE SEAL

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates to a magnetic latching system that allows a removable axis panel to separate from a latching land when access to the aircraft interior is desired. More particularly, the present invention relates to a pneumatically driven latching system suitable for rapid removal and reinstallation of aircraft outer mold line (OML) panels and doors.

In the building of aircraft, both civil and military, exterior panels, doors and other structures are provided which can be removed for repair or to allow access to aircraft systems, e.g. mechanical, electrical or hydraulic, disposed within the body of the aircraft. The panel doors are preferably formed flush with the adjacent aircraft surface, to avoid interference with aerodynamic characteristics of the aircraft. Irregularities in an aircraft surface can also mitigate stealth characteristics of an aircraft, as RF signals may reflect from surface irregularities and detract from low observable characteristics of the aircraft.

While panels may conventionally engaged to an aircraft surface by means of screws or similar fasteners, such connecting means commonly require torqueing the fasteners to a desired pressure, can result in wear and loosening of the fasteners during use, and can preload the panels into undesirable levels. Moreover, in practical circumstances of use, fasteners can fall into the aircraft interior when installing or removing the panel, creating potentially hazardous conditions with respect to mechanical and electrical systems disposed in the vicinity. As such, alternative latching systems are desirable in order to allow for greater ease of installation and removal, avoidance of creating undue loads on panel and mitigating the prospect of accidentally releasing undesirable debris within the aircraft body which may be difficult to locate and potentially damaging to aircraft electrical and mechanical systems. Further, as noted above, it is desirable such that latching system exhibit minimal surface irregularities, to retain desired aerodynamic and low observable characteristics. Preferably, such latching system will also provide suitable sealing characteristics to facilitate airtight and watertight isolation of the aircraft electrical/mechanical/hydraulic systems, as well as mitigating the potential for noise associated with gaps between adjacent aircraft surface portions.

These and other objects and advantages are addressed in the present invention, which is described in exemplary terms below, in connection with the illustrated embodiments.

BRIEF SUMMARY

A magnetic latching system is provided for removably latching a panel to an aircraft surface portion. The system includes a removable access panel defining an upper surface, a lower surface and side surfaces; the lower surface defining a panel lower peripheral surface. A plurality of magnetically attractive panel surface portions are disposed along at least a portion of the panel lower peripheral surface.

A latching land is provided which is connectable to the aircraft surface portion. The land defines an upper surface having an outer peripheral portion that is substantially coplanar with the aircraft surface portion; a seating surface for receiving and supporting the panel lower peripheral surface; and land side surfaces.

The land seating surface defines a plurality of magnetically attractive land surface portions disposed along at least a portion of the land panel seating surface.

A body of magnetic material is disposed intermediate the magnetically attractive panel surface portions and the magnetically attractive land surface portions, the body of magnetic material being operative to form a magnetic bond between the panel and the land, to urge the panel into magnetic engagement with the land seating surface, such that it is substantially coplanar with the aircraft surface portion.

An inflatable seal is provided intermediate the panel and the land, substantially adjacent the magnetic material. Upon inflation, the inflatable seal is operative to urge the panel away from the land far enough to weaken magnetic engagement between the panel and the land, sufficient to permit disengagement of the panel from the land.

In one embodiment the inflatable seal is disposed adjacent the panel magnetically attractive surface portions and/or the land magnetically attractive surface portions.

The panel side surfaces and the land side surfaces may be beveled to facilitate extension of the inflatable bladder intermediate the beveled surfaces, thereby facilitating upward movement of the panel, upon inflation of the bladder.

The inflatable bladder may be implemented as a unitary structure extending about the panel/land peripheral surface, or as a plurality of inflatable segments disposed at space locations about the panel/land peripheral surface, or portions thereof.

The magnetically attractive surface portions may be formed as a result of embedding magnetically attractive material in the land/panel about at least a portion of the periphery thereof. The magnetically attractive material may alternately be adhered, or otherwise secured to one of more of the land/panel peripheral surfaces.

Upon inflation of the inflatable seal, the panel will separate from the land, as described above. The intermediate body of magnetic material will remain attached to either the land or the panel, depending upon which includes the thicker body of magnetically attractive material (the most attractive). A plurality of sheer pins are disposed vertically intermediate the panel and the land to maintain horizontal orientation of the panel with respect to the land and to direct separation of the panel/land in a perpendicular direction.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

Figure 1:
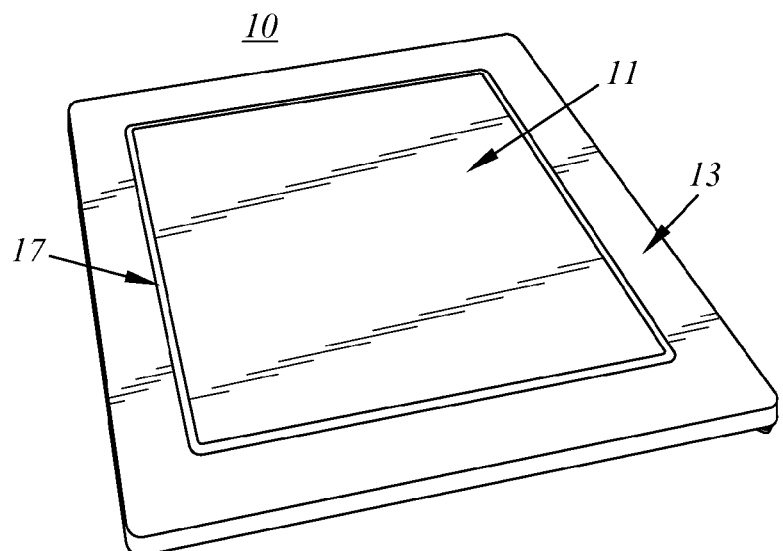
FIG. 1 is a top perspective view of a magnetic latching system in accordance with one embodiment of the present invention.

FIG. 1 illustrates an exemplary magnetic latching system in accordance with the present invention. The exemplary magnetic latching system 10 includes a removable access panel 11 and a latching land 13. The latching system 10 is designed to mate with an aircraft surface portion, to be substantially flush therewith. As described further below, the magnetic latching system functions to allow the removable access panel 11 to separate from the latching land 13, e.g., when access to the interior is desired. After that, panel 11 may be magnetically reengaged to the land 13 for secure connection until removal is again desired.

Figure 2:
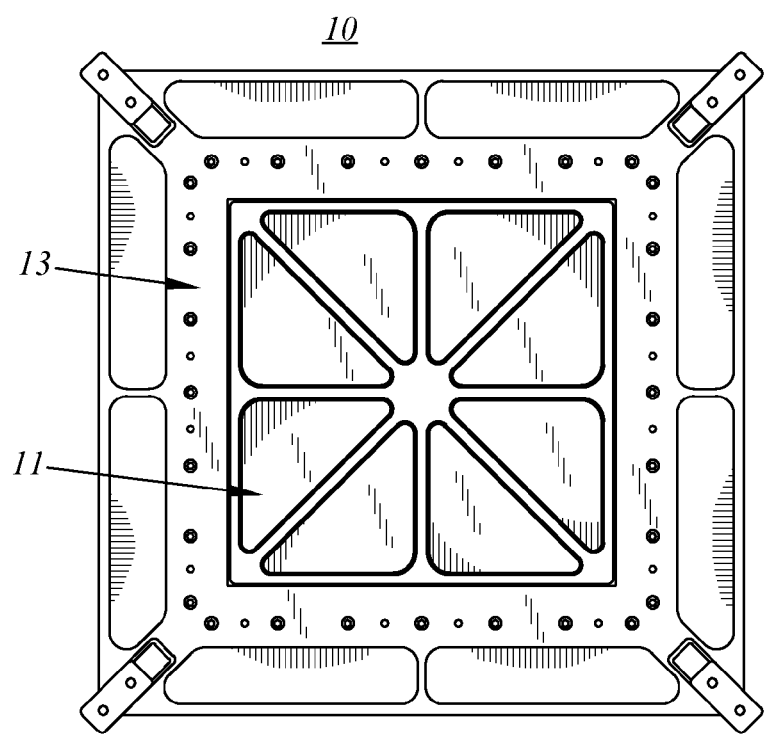
FIG. 2 is a bottom view of the magnetic latching system.

FIG. 2 illustrates a rear view of the magnetic latching system 10, showing the removable access panel 11 disposed within the latching land 13.

Figure 3:
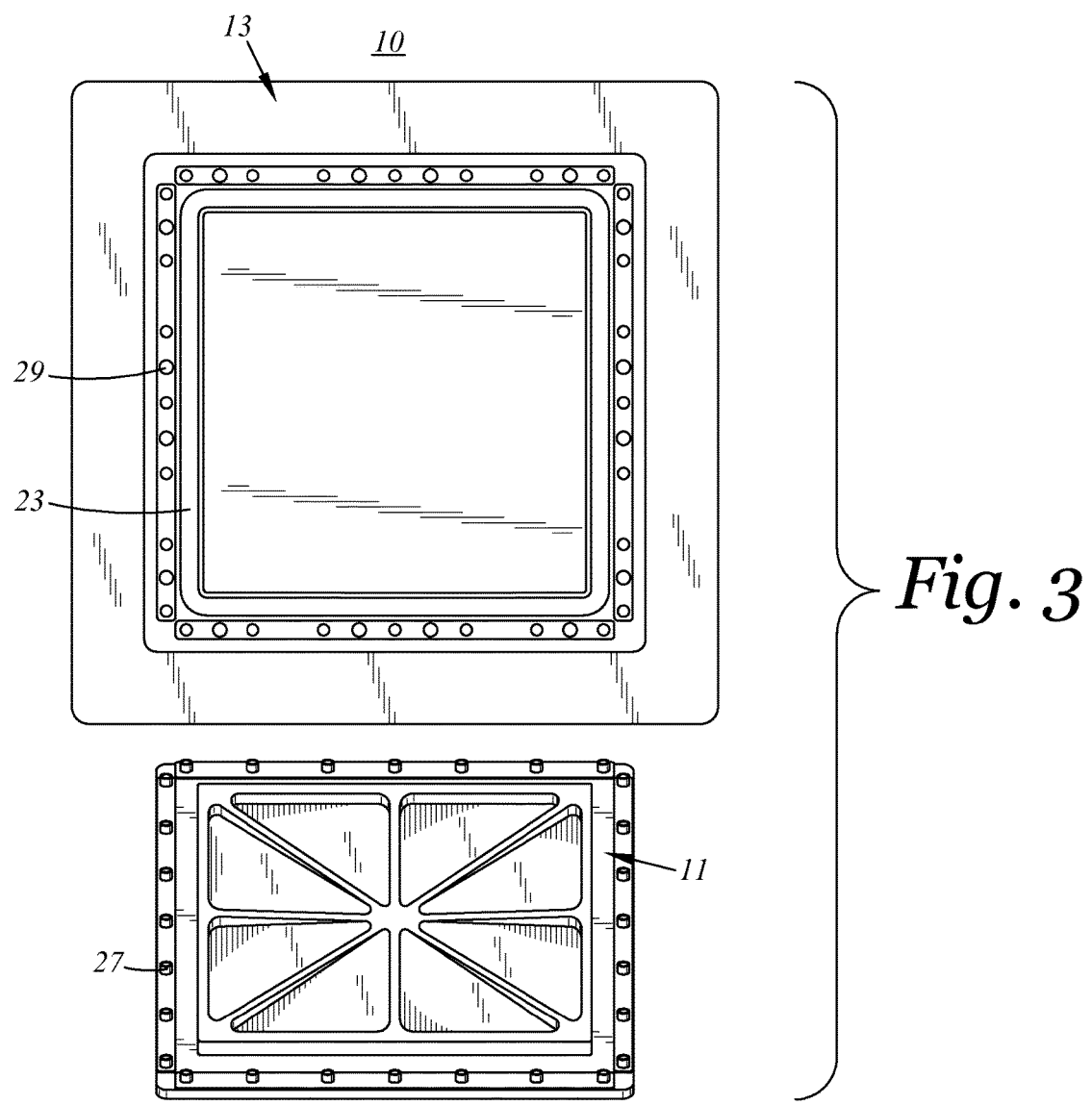
FIG. 3 is a top view of the magnetic latching system having the removable access panel separated from the latching land.
Figure 4:
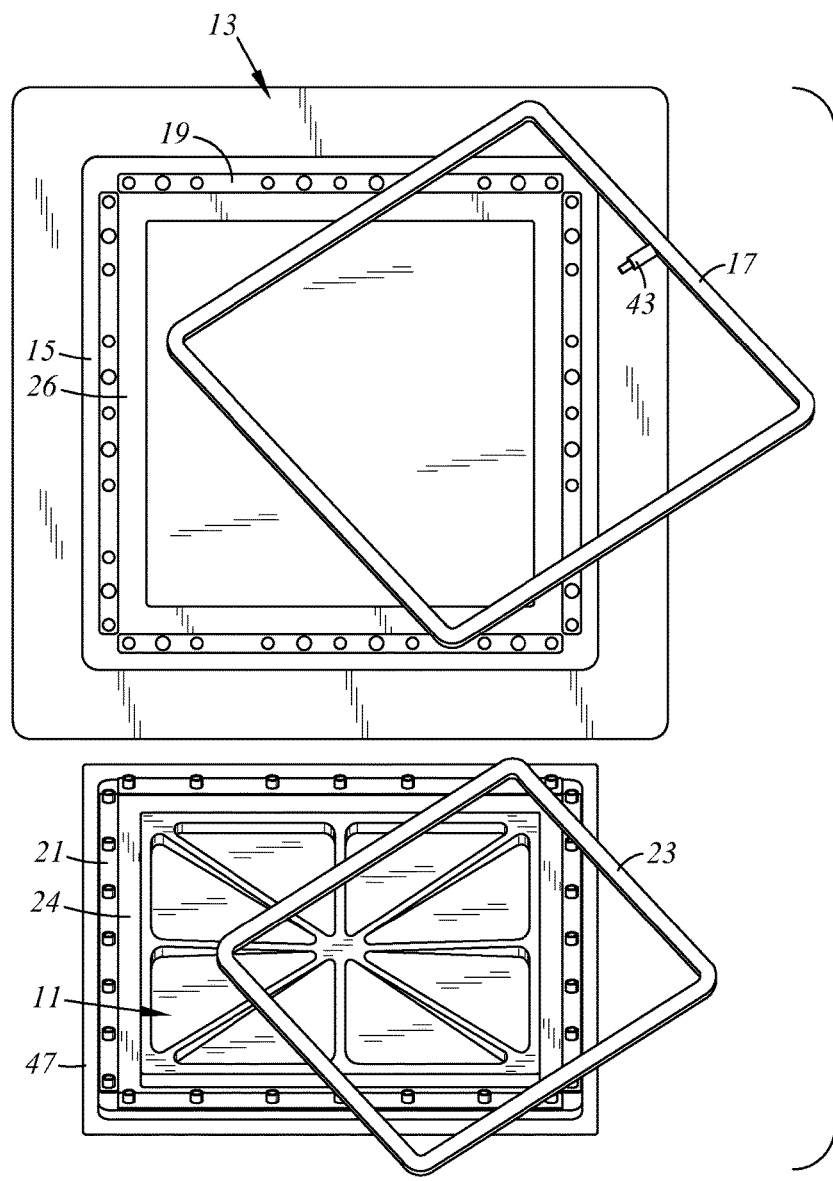
FIG. 4 illustrates the construction shown in FIG. 3, with an inflatable bladder and magnetic material separated from the access panel and the land.

FIGS. 3 and 4 provide additional detail respecting the construction of the removable access panel 11 and the latching land 13. FIGS. 5-8 provide cross-sectional views of the interface between the access panel 11 and the latching land 13, to illustrate the engagement and the disengagement therebetween.

Referring to FIGS. 3 and 4, panel 11 includes a plurality of sheer pins 27 extending perpendicularly from panel 11. The sheer pins 27 are arrayed to engage with apertures 29 formed on the surface of land 13. The sheer pins 27 may be bonded to panel 11, outboard or inboard of the panel lower peripheral surface. When the panel 11 is disposed on the land 13, the sheer pins 27 extend into the apertures 29, to maintain horizontal orientation of the panel 11 with respect to the land 13.

As shown at FIGS. 4-8, the panel 11 includes a lower surface 12, which defines a magnetically attractive lower peripheral surface 24. The land 13 similarly includes a seating surface 14 which defines a magnetically attractive surface portion 26 extending thereabout, which is in substantial registry with panel surface 24 when the panel 11 and the land 13 are mated together.

The magnetically attractive surface portions 24, 26 may be formed by embedding magnetically attractive material, e.g. material containing iron, along the areas 24, 26. Alternatively, the magnetically attractive surface portions 24, 26 may alternatively be formed by adhering, or otherwise securing strips of magnetically attractive material to the adjacent panel and land surface portions.

The magnetically attractive surface portions 24, 26 may be formed about the surface of the panel 11 or land 13 to form a continuous magnetically attractive surface region. While the embodiments shown at FIGS. 3 and 4 include continuous surface portions 24, 26, extending about the panel 11 and land 13, it will be understood by those skilled in the art that the surface portions 24, 26 may be segmented about the same surface area, or some portion thereof Referring again to FIG. 4, a body of magnetic material 23 is shown. The magnetic material 23 may be initially disposed upon land surface portion 26, as shown in FIG. 3. Alternatively, the magnetic material 23 could be initially disposed upon panel surface portion 24. In either case, the magnetic material 23 would be magnetically engaged to an adjacent region of magnetically attractive material. As such, when the panel 11 is engaged to land 13, the magnetic material 23 will become disposed intermediate surface portions 24, 26, and magnetically engaged to both magnetically attractive surface portion 24 of panel 11, as well as magnetically attractive surface portion 26, of land 13, thereby magnetically securing panel 11 to land 13.

As one of ordinary skill will recognize, the magnetic material 23 may be also formed in segments or may be formed as a unitary continuous structure as shown at FIGS. 3 and 4.

Figure 9:
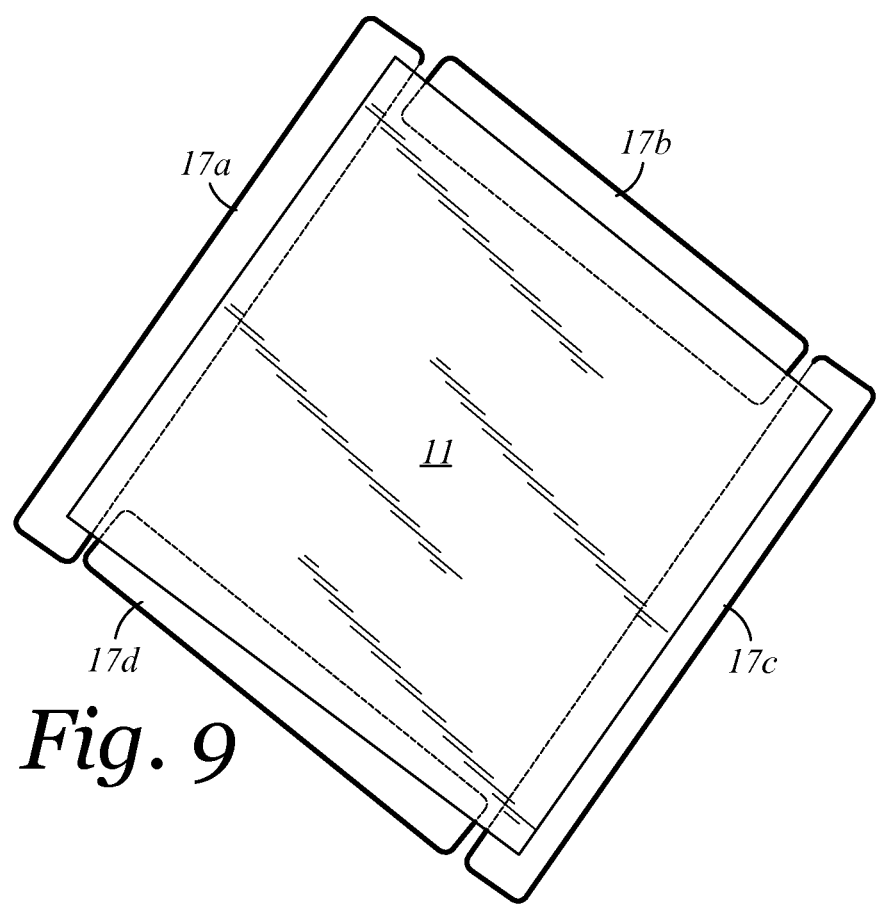
FIG. 9 is a top perspective view of the access panel with the inflated bladder shown to be formed in segments.

Referring again to FIG. 4, an inflatable bladder 17 is shown, which may be inflated to separate the panel 11 from the land 13, as further described below. The bladder 17 may be formed as a continuous structure, as shown at FIG. 4, or may be formed as one or more segments, as shown at FIG. 9, illustrated in an inflated condition.

The inflatable bladder 17 is initially disposable substantially about the periphery 47 of panel 11, or about the periphery 15 of land 13. As described in more detail in relation to FIGS. 5-8, the inflated bladder 17 transitions from a non-inflated state, wherein the panel 11 is disposed substantially flush with land 13, to an inflated state wherein the upper surface of panel 11 becomes elevated relative to upper surface of land 13, allowing for removal of the panel 11 from the land 13.

Figure 11:
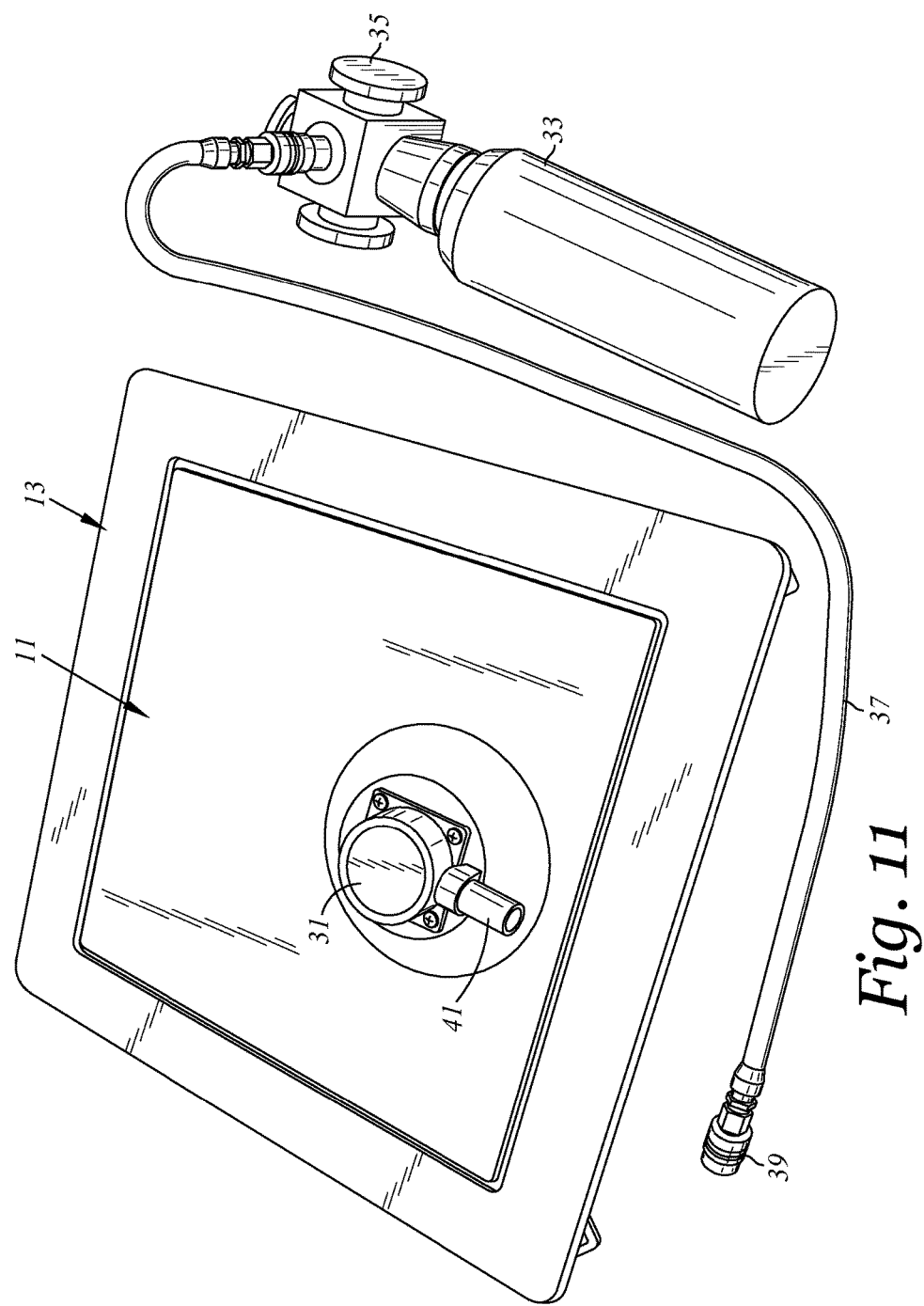
FIG. 11 is a top perspective view of the panel and land, with a pressure source for inflating the inflatable seal.

Referring again to FIGS. 4, 5 and 11, it is seen that the inflatable bladder 17 includes a connector 43 that is engageable to conduit 45 extending through a portion of panel 11. Conduit 45 terminates at hose connector 41, formed in housing 31, disposed on an upper surface portion of the panel 11. Connector 41 is engageable to a pressure source 33, through pressure regulator 35, conduit 37 and connector 39, as shown at FIG. 11. Operation of regulator 35 allows pressurized gas to be communicated to the bladder 17, to inflate the bladder, thereby separating the panel 11 from the land 13. As will also be apparent from the figures, bladder 17 serves to provide a resilient barrier extending between panel 11 and land 13, about the periphery thereof. The bladder facilitates sealing the interior surface of the aircraft from air and water that might otherwise pass into the interior of the aircraft, through gaps between the panel 11 and land 13. The bladder 11 also mitigates the potential for wind noise arising from any such gaps when the aircraft is in flight.

Figure 5:
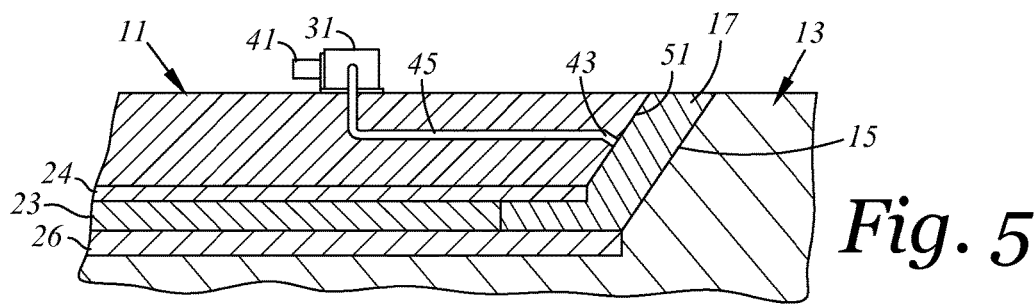
FIGS. 5-8 are sectional views illustrating the inflation of the bladder to separate the access panel from the land.

It should be understood that various alternative configurations may be implemented to inflate the bladder 17. For example, bladder 17 may include a connector extending from the bladder 17, along the adjacent upper surface of panel 11, avoiding the need for forming a conduit 45 through panel 11, as shown at FIG. 5.

As shown at FIGS. 5-8, the panel defines an outer surface 51 which extends downwardly and inwardly from the upper surface of panel 11. The land 13 describes a mating/corresponding beveled surface 15, which extends downwardly and inwardly from the upper surface of land 13. The inflated bladder 17 is disposed intermediate the surfaces 51 and 15, and may also extend horizontally intermediate the surfaces 24, 26 of the panel and the land, respectively. When the bladder 17 is inflated the surfaces 24, 26 are urged to separate, as are surfaces 15, 51.

Referring to FIGS. 5-8, FIGS. 5, 7 show the magnetic latching system 10 in a latched position, wherein the upper surface of panel 11 is disposed substantially flush with the upper surface of land 13. Magnetic material 23 is shown in abutting contact with panel section of magnetically attractive material 24 and land section of magnetically attractive material 26. The bladder 17 is shown as uninflated condition.

Figure 6:
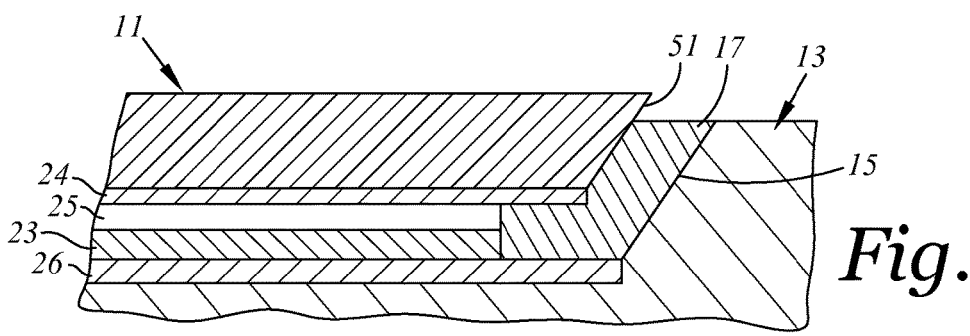

In FIG. 6, the bladder 17 is inflated, causing the panel area of magnetically attractive material 24 to separate from magnetically material 23, forming a space 25 therebetween. As will be apparent to one of ordinary skill in the art, the magnetic material 23 remains attached to a section of the land area of magnetically attractive material 26, as material 26 is formed to be thicker than material 24, and the magnetic material 23 will remain attached to the thicker of the sections, when the panel 11 and land 13 are separated from their magnetically locked orientation.

Figure 7:
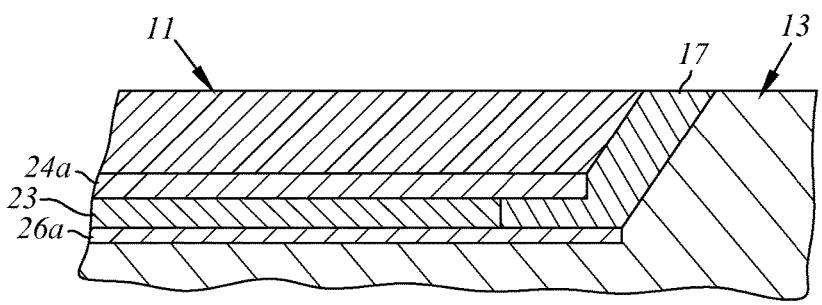
Figure 8:
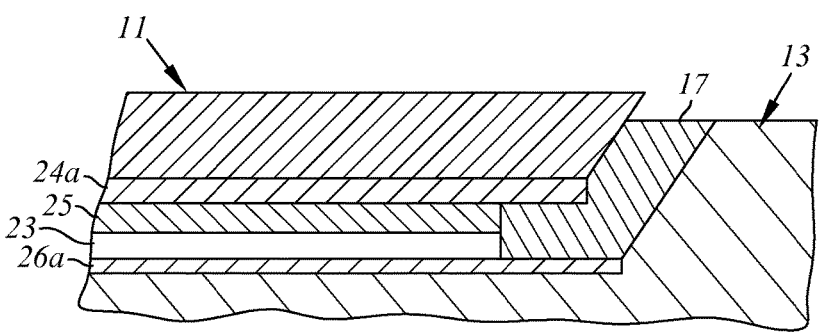

FIGS. 7 and 8 illustrate a construction similar to FIGS. 5 and 6, except that, as shown at FIG. 7, the panel section of magnetically attracted material 24a is thicker than the land section of magnetically attractive material 26a. As a result, when the bladder 17 is inflated, as shown at FIG. 8, the magnetic material 23 remains attached to the panel section of the magnetically attractive material 24a, rather than the land section of the magnetically attractive material 26a. As will be apparent to those skilled in the art, housing 31 and connector 41 may be eliminated from the construction, or removable from the surface of panel 11 until inflation of the bladder 17 is desired. In such case, the surface of panel 11 will remain substantially smooth until a pressure source is engaged to conduit 45, e.g. by engagement of the housing 31 to a flush mounted quick connect fitting extending through the panel 11 in fluid connection with conduit 45.

FIG. 9 illustrates a top perspective view of a panel 11, where the inflated bladder 17 is shown as segments 17a-17d, after the segments have been inflated. As shown in FIG. 9, the segments 17a-17d may inflate to extend beyond and above the surfaces 51, 15 of the panel 11 and land 13, respectively.

Figure 10:
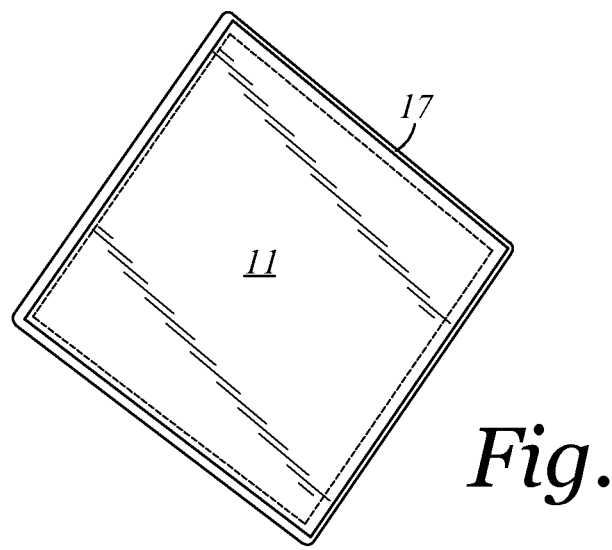
FIG. 10 is a top perspective view of the panel where the bladder is formed as a continuous structure, shown in an uninflated condition.

FIG. 10 provides a top perspective to of the panel 11 wherein the inflated bladder 17 is formed as a continuous structure, shown in uninflated condition about the lower perimeter of panel 11, and extending a short distance along the lower peripheral surface of panel 11, as more clearly shown at FIGS. 5-8.

In one embodiment the panel 11 and/or the land 13 may be formed of graphite composite materials. The magnetically attractive material may be implemented as Kovar, a low expansion alloy primarily composed of iron, nickel and cobalt. The magnetic engagement of the panel 11 and land 13 typically results in a magnetic clamping of the panel/land, characterized by a pull force of between 4-24 pounds, with a Br Max of approximately 14,800 Gauss and a BH Max of approximately 15 MGOe.

The inflatable seal is expected to be designed to be inflatable to 100 psi or less. In one embodiment the seal is inflatable to thirty psi.

As indicated above, the present invention is described in connection with the illustrated embodiments, which are intended to be exemplary, but not limiting. As will be apparent to those of ordinary skill in the art, alternative constructions of panel 11, land 13, as well as the inflatable bladder 17 and the magnetic material 23 may be implemented without departing from the broader aspects of the present invention.

What is claimed is:

1. A magnetic latching system for removably latching a panel to an aircraft surface portion, the system comprising:
   a removable access panel defining an upper surface, side surfaces, and a panel lower peripheral surface;
   a plurality of magnetically attractive panel surface portions disposed proximate at least a portion of the panel lower peripheral surface;
   a latching land connectable to the aircraft surface portion, the land defining an upper surface having an outer peripheral portion that is substantially coplanar with the aircraft surface portion, a seating surface for receiving and supporting the panel lower peripheral surface, and land side surfaces;
   the land seating surface defining a plurality of magnetically attractive land surface portions disposed along at least a portion of the land panel seating surface;
   a body of magnetic material disposed intermediate the magnetically attractive panel surface portions and the magnetically attractive land surface portions, the body of magnetic material being operative to form a magnetic bond between the panel and land to urge the panel into a magnetic engagement with the land seating surface, such that the panel upper surface is substantially coplanar with the aircraft surface portion; and
   an inflatable seal disposed intermediate the panel and the land, adjacent the magnetic material, upon inflation the inflatable seal being operative to urge the panel away from the land far enough to weaken magnetic engagement between the panel and the land sufficient to permit disengagement of the panel from the land.

2. The magnetic latching system as recited in claim 1 wherein the inflatable seal is disposed adjacent the panel magnetically attractive surface portions and the land magnetically attractive surface portions.

3. The magnetic latching system as recited in claim 2 wherein the panel side surfaces are beveled inwardly and downwardly from the panel upper surface.

4. The magnetic latching system as recited in claim 3 wherein the land side surfaces are beveled inwardly and downwardly from the land seating surface.

5. The magnetic latching system as recited in claim 4 wherein the inflatable seal is extends intermediate at least one panel side surface and at least one land side surface.

6. The magnetic latching system as recited in claim 1 wherein the inflatable seal extends about the panel side surfaces.

7. The magnetic latching system as recited in claim 1 wherein the inflatable seal extends about the land side surfaces.

8. The magnetic latching system as recited in claim 1 wherein the inflatable seal defines a plurality of inflatable seal segments disposed at spaced locations along the panel seating surface.

9. The magnetic latching system as recited in claim 8 wherein each seal segment is in pneumatic communication with other sealed segments.

10. The magnetic latching system as recited in claim 1 wherein the inflatable seal extends outwardly beyond the magnetic strips.

11. The magnetic latching system as recited in claim 10 wherein the inflatable seal extends intermediate at least one panel side surface and at least one land side surface.

12. The magnetic latching system as recited in claim 1 wherein the magnetically attractive panel surface portions are formed of magnetically attractive material embedded in the panel lower peripheral surface.

13. The magnetic latching system as recited in claim 12 wherein magnetically attractive land surface portions are formed of magnetically attractive material embedded in the land seating surface.

14. The magnetic latching system as recited in claim 1 wherein the panel magnetically attractive panel surface portions comprise of strips of magnetically attractive material secured to the panel lower peripheral surface.

15. The magnetic latching system as recited in claim 14 wherein magnetically attractive land surface portions comprise strips of magnetically attractive material secured to the land seating surface.

16. The magnetic latching system as recited in claim 1 wherein the magnetically attractive panel surface portions define a first thickness and the magnetically attractive land surface portions define a second thickness, and wherein the first thickness is less than the second thickness, such that upon inflation of the seal, the body of magnetic material is separated from the panel lower surface but remains magnetically attached to the land seating surface.

17. The magnetic latching system as recited in claim 1 wherein the magnetically attractive panel surface portions define a first thickness and the magnetically attractive land surface portions define a second thickness, wherein the first thickness is greater than the second thickness, such that upon inflation of the seal, the body of magnetic material is separated from the land seating surface, but remains magnetically attached the panel lower surface.

18. The magnetic latching system as recited in claim 1 wherein the panel is formed of graphite composite material.

19. The magnetic latching system as recited in claim 18 wherein the land is formed of graphite composite material.

20. The magnetic latching system as recited in claim 1 furthering comprising a plurality of shear pins vertically extending between the panel and the land, to maintain horizontal orientation of the panel with respect to the land.

\* \* \* \* \*